Patented Mar. 4, 1930

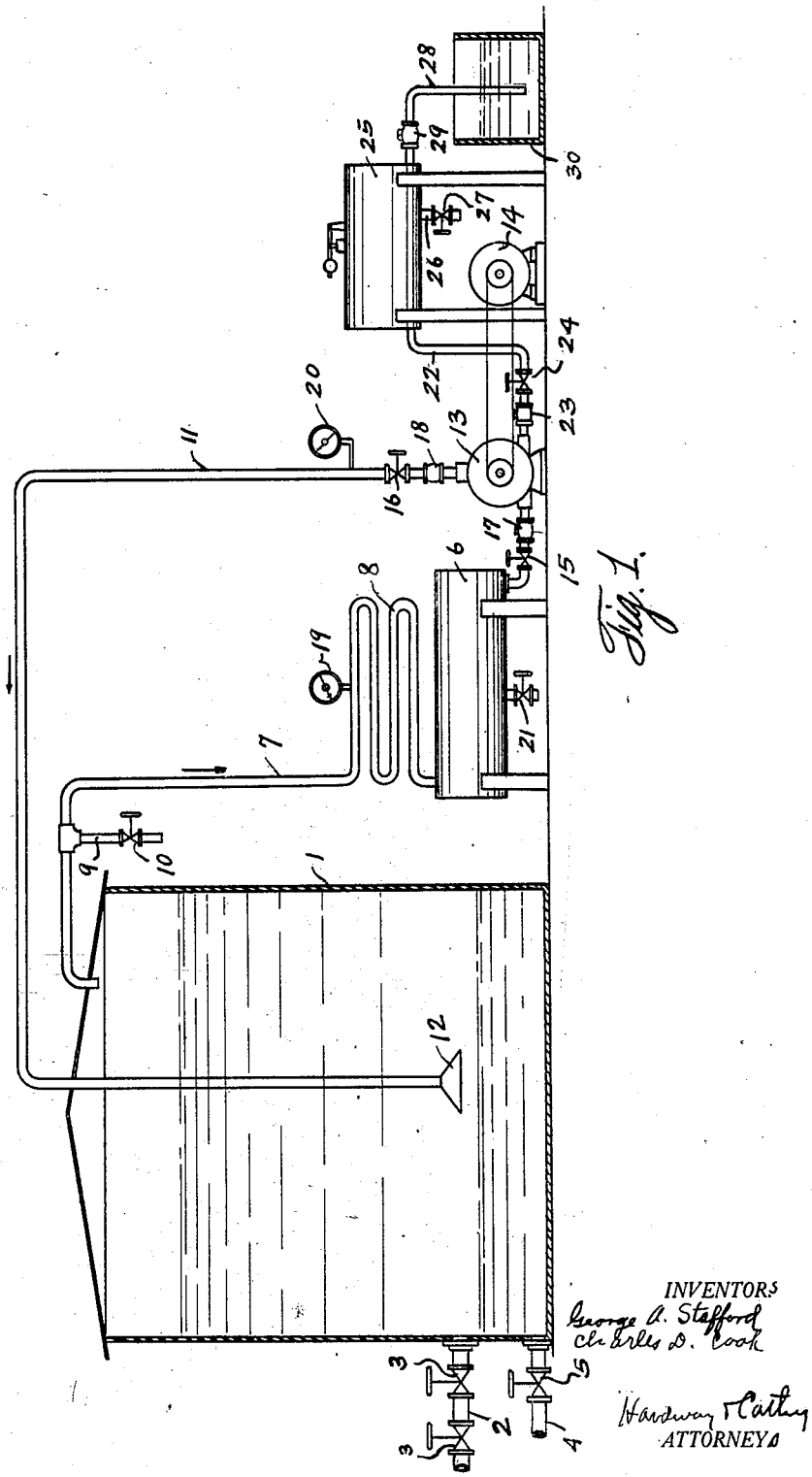

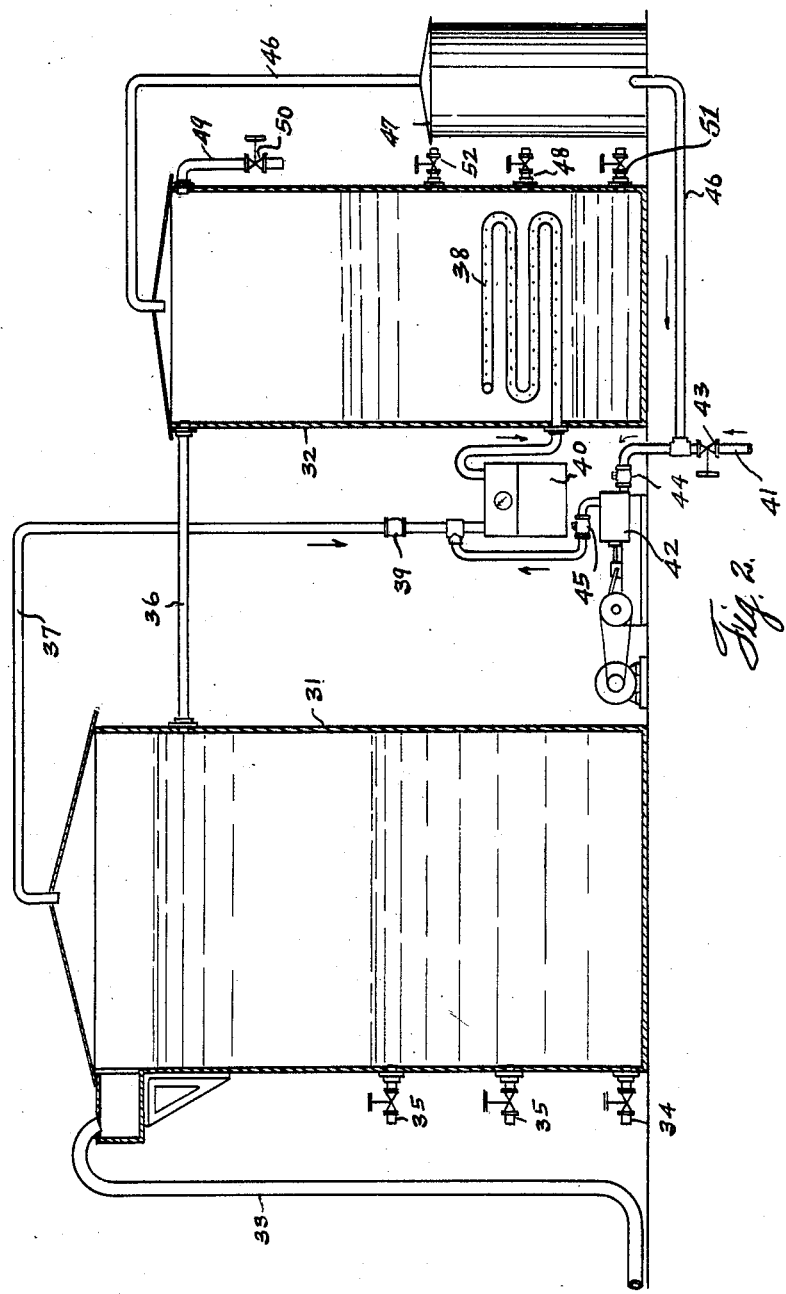

1,749,235

UNITED STATES PATENT OFFICE

GEORGE A. STAFFORD AND CHARLES D. COOK, OF SOUR LAKE, TEXAS

APPARATUS FOR TREATING CRUDE PETROLEUM

Application filed February 16, 1925. Serial No. 9,629.

This invention relates to new and useful improvements in an apparatus for treating crude petroleum.

One object of the invention is to provide an apparatus of the character described whereby the vapor or gas given off from crude oil, may be saved and used in the treatment of crude oil, and whereby the said gas may be re-introduced into, and mixed with the oil thereby improving, or raising the gravity and quality of the oil, as well as making the same more fluent, so that the oil will more readily flow through the pipe line through which it is to be delivered.

The oil as treated by this process need not be heated, so the process may be designated as the cold process of treating crude oil.

With the above and other objects in view this invention has particular relation to a certain novel process and certain novel features of construction, operation and arrangement for carrying on said process, an example of said construction being described in this specification and illustrated in the accompanying drawings, wherein:—

Figure 1 shows a side elevation, partly in section, of the apparatus and

Figure 2 shows a side view, partly in section of another form of the apparatus.

Referring now more particularly to the drawings, wherein like numerals of reference designate similar parts in each of the figures, the numeral 1 designates an oil tank, preferably constructed of steel, and formed air tight. Crude oil is admitted to, and withdrawn from said tank, at or near its bottom, through the line 2, which is controlled by the gate valves 3, 3. The water settlings in the tank may be drawn off through the line 4 controlled by the gate valve 5.

The numeral 6 designates a condenser tank and a line 7 is connected at one end, into the top of the tank 1, above the oil therein, and is formed into a coil 8 above the condenser tank and its other end is connected into said last named tank.

The line 7 has an air inlet nozzle 9, controlled by the valve 10. This valve may be opened to admit air into the tank 1 when oil is being run therefrom through the line 2.

A return line 11 is provided, which is connected, at one end, into the bottom of the condenser tank 6 and said return line enters through the top of the tank 1 and depends down and terminates near the bottom of said tank 1, so as to be submerged in the oil therein, and said end is flared forming a discharge nozzle 12. Incorporated in this return line there is a pump 13, preferably of the rotary type, and connected to and driven by the motor 14. On each side of the pump the return line is provided with a gate valve, as 15, 16 and a one-way back pressure valve as 17, 18.

The lines 7 and 11 are each equipped with a pressure gauge as 19, 20, the former to indicate the pressure of the vapor through the line 7 and the latter to indicate the pressure in the line 11. The indicated pressure of the last mentioned gauge, will also reveal approximately the quantity of oil in the tank 1.

The gas accummulating in the tank 1, above the oil therein will pass through the line 7 and will be partly condensed by the coil 8 and tank 6 into liquid form. If desired the liquid may be drained out of the condenser tank 6 through the drain cock 21 at its bottom. The gas, and liquid in the tank 6 is forced by pressure in the tank 1, or by the pump 13 if necessary, back through the return line 11 and discharged into the crude oil near the bottom of the tank 1. This gas and liquid will be reincorporated into the crude oil and will raise the gravity and quality thereof, thus saving the gas which at present is wasted, and making the crude oil lighter and more fluent, so that it will run more readily through the line. A branch discharge line 22 leads from the discharge of the pump 13, is equipped with a one-way back pressure valve 23 and a gate valve 24 and enters the reserve tank 25. This tank is provided to take care of the surplus gas, not needed in treating the oil. A service line 26, controlled by the shut off valve 27, leads from this tank and through which the gas therein may be drawn off for use. A safety line 28 leads from the tank 25 and is controlled by a back pressure safety valve 29, and its free end is submerged in water in the open tank 30. This safety line relieves the tank 25 from excessive pressure and in case the free gas should become ignited the water trap described will prevent communication of the fire to the gas in the reserve tank 25.

In Figure 2 the apparatus is shown as connected with the lines through which oil and gas is conducted from the wells in the field.

In this form of the apparatus the numeral 31 designates the main oil separating tank in which the water is separated from the oil, and the numeral 32 designates the treating tank of somewhat smaller dimensions than the oil tank. A flow line 33, connected with the wells conducts the oil, either by gravity or pressure into the top of the oil tank 31. This tank has the bottom valve control drain line 34 to drain off water and above it the gauge cocks 35, 35 for ascertaining the quantity of oil in said tank.

A delivery line 36 connects said tanks, near the top, through which the oil from the top of the tank 31 is delivered into the tank 32, the receiving end of this line being below the oil level in the separating tank 31. The gas accumulating in the tank 31 above the oil is conducted through the gas line 37 which leads from the top thereof and enters through the side of the treating tank 32 and is formed into a perforated coil 38, located within and near the bottom of said last named tank so as to be submerged in the oil therein. This coil may be covered with suitable wire mesh if desired. The gas line 37 has a suitable one way back pressure valve 39 and is equipped with a gas meter 40 to measure the quantity of gas flowing through the line.

A gas flow line 41 is connected with gas producing wells, in the field, at one end and its other end is connected into the gas line 37 between the valve 39 and the meter 40, so that, if desired, the gas from said wells, commonly called casing head gas may be used in the oil treatment, and thus saved instead of being wasted as at present. The gas flow line 41 is equipped with a pressure pump 42, which, if the normal pressure is not sufficient, may be used to force the gas through either line 37 or 41, or both, into the oil in the treating tank 32, through the perforated coil 38. On one side of the pump the line 41 is equipped with a shut off valve 43 and a one way back pressure valve 44 and on the other side of the pump, and located between the pump and meter 40 the line 41 is equipped with a one way back pressure valve 45.

Gas accumulating in the treating tank 32 is conducted through the circulating line 46, one end of which is connected into the top of the treating tank 32 and whose other end is connected into the gas flow line 41 between the valve 43 and the pump 42. This arrangement provides for the constant reintroduction of gas into the oil in the treating tank to the end that it may be kept thoroughly saturated with the volatile elements tending to escape from it. A reserve gas tank as 47 may be incorporated into the line 46 if desired.

The treated oil is drawn off from the treating tank through the valve controlled delivery line 48. In drawing the oil off from this tank air is admitted into the tank, through the air inlet 49, at the top of the tank, which is controlled by the inlet valve 50.

At the bottom of the tank 32 there is a water drain cock 51, and arranged above the delivery line 48 there is a gauge cock 52 provided to test the oil level in said tank.

The apparatus illustrated in Figure 2 is merely illustrative of the principle employed, as a plurality of separating tanks and treating tanks would have to be employed in order to make the apparatus of practical utility for general use in connection with oil field operations.

What we claim is:—

1. An apparatus of the character described including a separating tank adapted to contain oil to a certain level, a treating tank, a flow line entering the separating tank, a delivery line connecting said tanks near the tops thereof, one end of which is connected into the separating tank beneath the oil level thereof, a gas line connected into the top of the separating tank and terminating within the treating tank near the bottom thereof, a back pressure valve controlling said gas line, a gas flow line connected into said gas line between said valve and the treating tank, a shut off valve controlling the gas flow line, a circulating line one end of which is connected into the top of the treating tank and whose other end is connected into said gas flow line between said shut off valve and back pressure valve.

2. An apparatus of the character described including separating tank adapted to contain oil to a certain level, a treating tank, a flow line entering the separating tank, a delivery line connecting said tanks at their upper ends one end of which is connected into the separating tank beneath the oil level thereof, a gas line connected into the top to the separating tank and terminating within the treating tank near the bottom thereto, a back pressure valve controlling said gas line, a gas flow line connected into said gas line, between said valve and treating tank, a shut off valve controlling the gas flow line, a circulating line one end of which is connected into the top of the treating tank and whose other end is connected into said gas flow line between said shut off valve and back pressure valve, and a pressure pump connected into said gas flow line.

3. An apparatus of the character described including separating tank adapted to contain oil to a certain level, a treating tank, a flow line entering the separating tank, a delivery line connecting said tanks, one end of which is connected into the separating tank beneath the oil level thereof, a gas line connected into the separating tank, above the oil level therein, and terminating within the treating tank near the bottom thereof, a back pressure valve controlling said gas line, a gas flow line connected into said gas line between said valve and the treating tank, a shut off valve controlling the gas flow line, a circulating line one end of which is connected into the top of the treating tank and whose other end is connected into said gas flow line between said shut off valve and back pressure valve, a pressure pump connected into said gas flow line, and one way back pressure valves in said gas flow line one on each side of said pump.

In testimony whereof we have signed our names to this specification.

GEORGE A. STAFFORD.
   CHARLES D. COOK.